June 13, 1950 — I. DASHKIN ET AL — 2,511,431
ADMISSION TICKET DEVICE
Filed Oct. 16, 1946 — 3 Sheets-Sheet 1
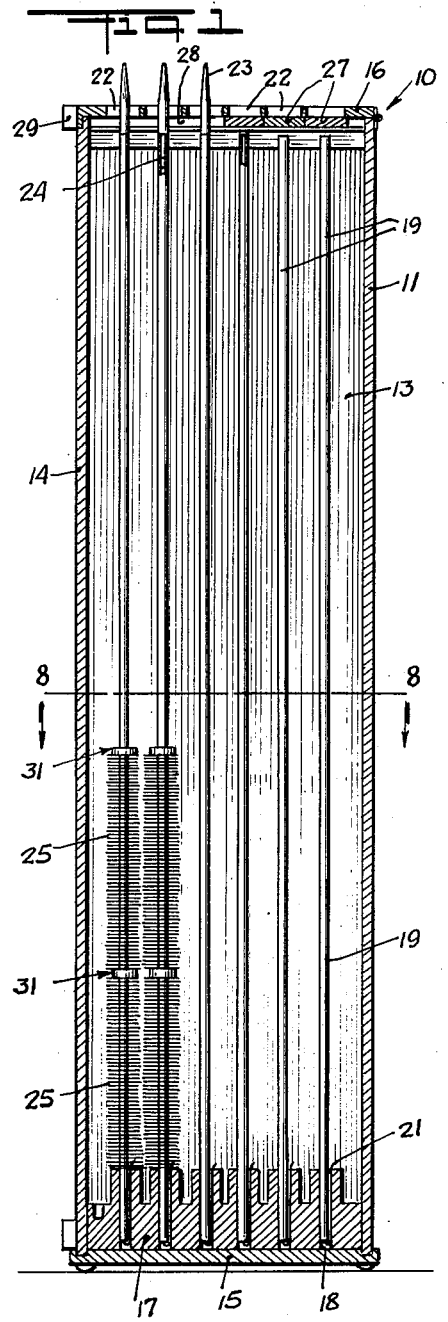
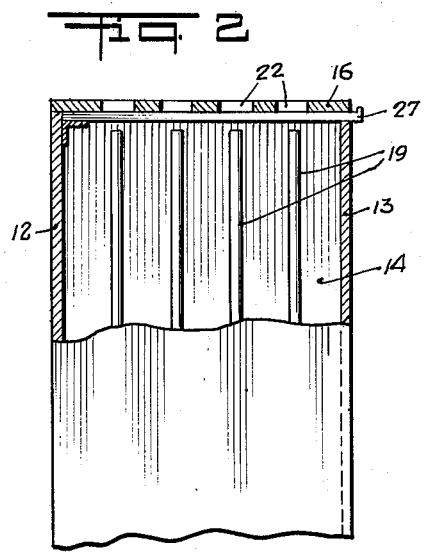
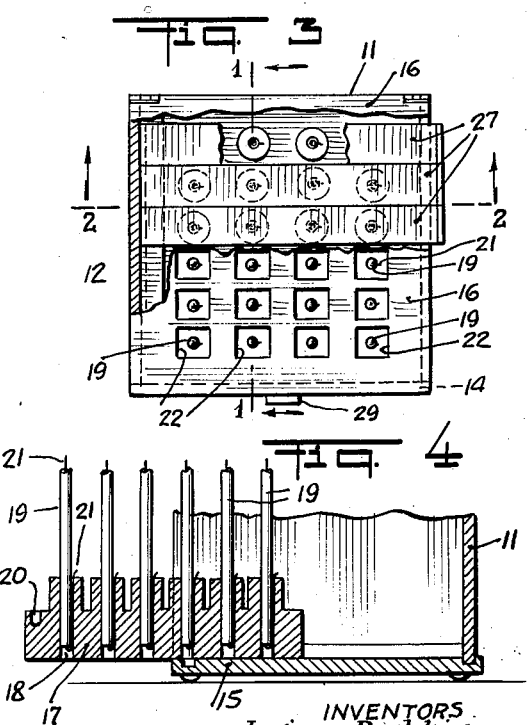
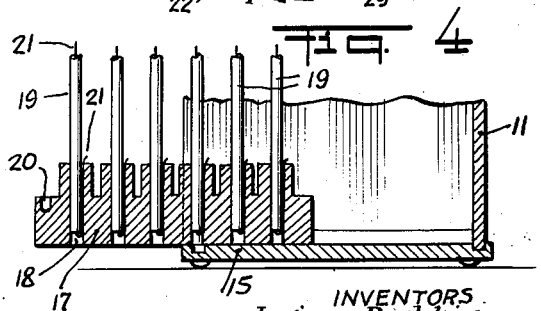
INVENTORS
Irving Dashkin
Henry Randel
BY
Irving Seidman
ATTORNEY

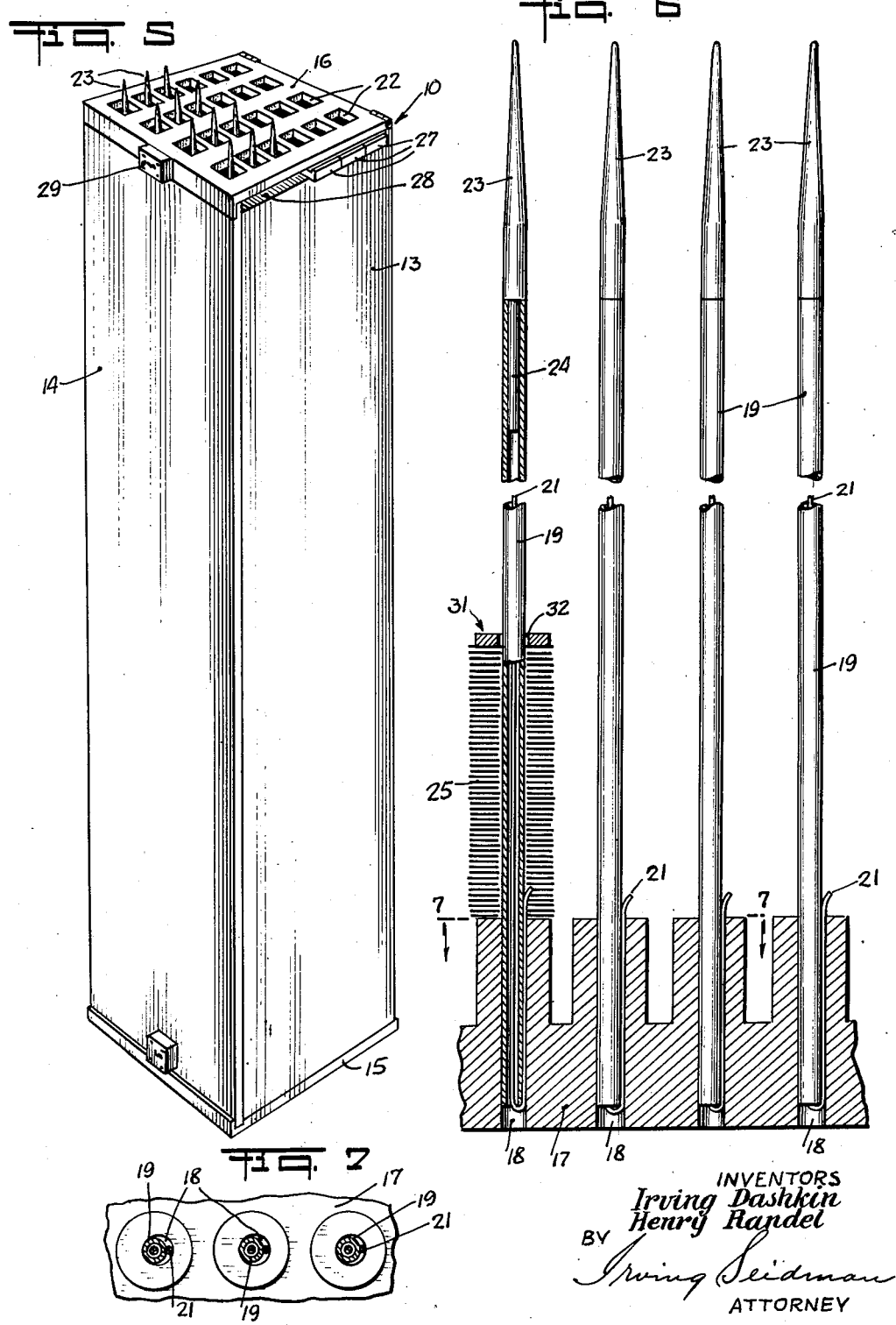

June 13, 1950
I. DASHKIN ET AL
2,511,431
ADMISSION TICKET DEVICE
Filed Oct. 16, 1946
3 Sheets-Sheet 3
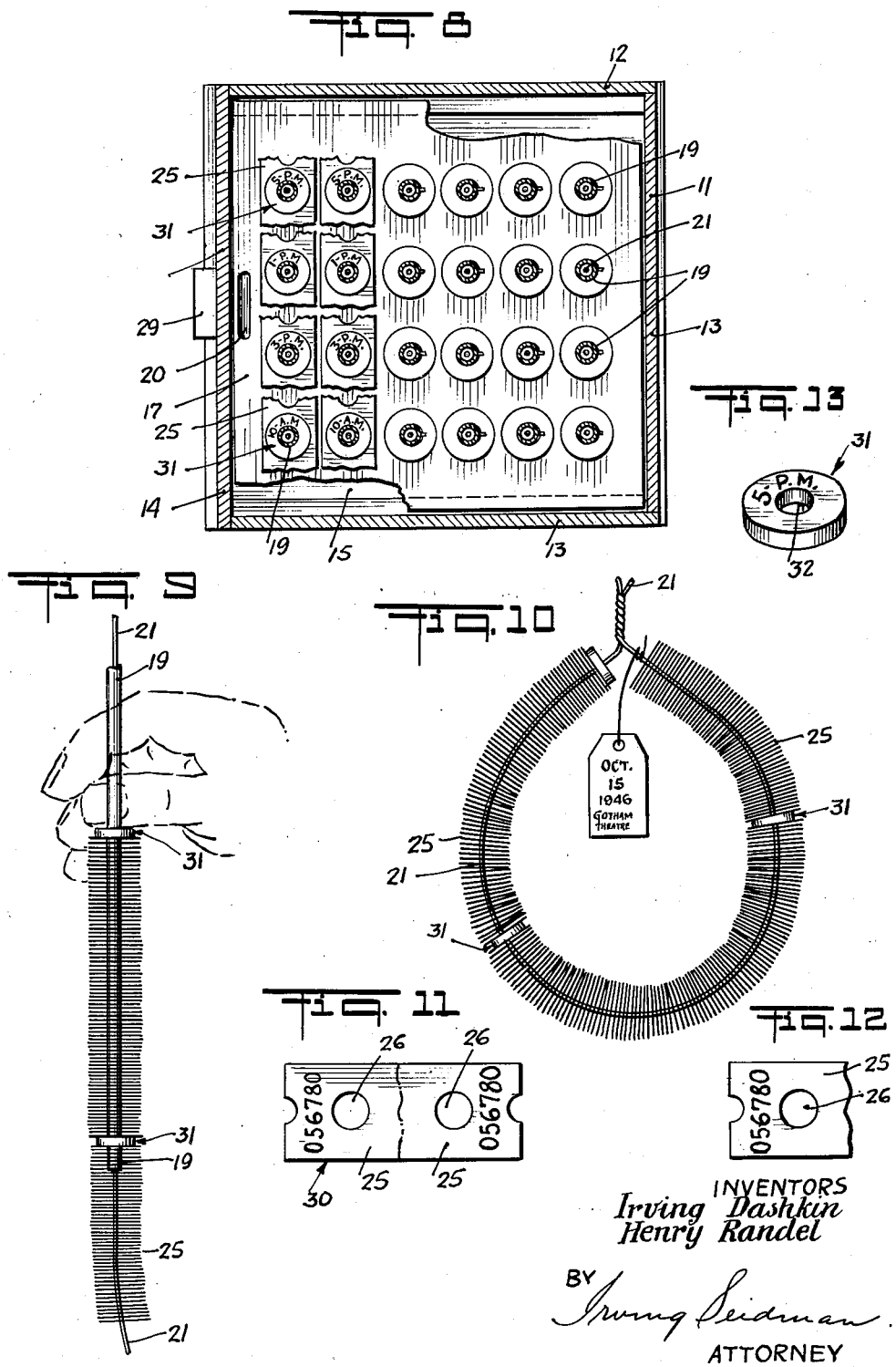
INVENTORS
Irving Dashkin
Henry Randel
BY Irving Seidman
ATTORNEY

Patented June 13, 1950

2,511,431

UNITED STATES PATENT OFFICE

2,511,431

ADMISSION TICKET DEVICE

Irving Dashkin, Jamaica, and Henry Randel, New York, N. Y., assignors to Stub-Rod Control Corporation of America, New York, N. Y.

Application October 16, 1946, Serial No. 703,542

3 Claims. (Cl. 129—23)

This invention relates to an admission ticket receiving device, an improved theatre ticket, and a method of collecting and filing admission tickets.

Broadly, it is an object of the invention to provide a device for receiving tickets in a more or less consecutive manner in order to keep an accurate check upon the admission tickets sold to the public.

More particularly, it is an object of the invention to provide a device to collect ticket stubs in order to periodically determine the number of tickets sold during uniform intervals of time such as hourly periods.

Another object of the invention is to provide a means for segregating admission tickets with regard to the price of such admissions, that is admission tickets for children and grown-ups and tickets of different range of prices for grown-ups such as lounge, and orchestra and balcony seats.

Still a further object of the invention is to provide a means for removing the tickets or stubs from the device for checking at different times and to retain such tickets or stubs for future reference, such as taxation and checking by the theatre owner or authorized person.

A further object of the invention is to provide an improved theatre ticket which can be readily disposed within the device so that the tickets can be more or less consecutively gathered in order to check upon the sales, both total sales and periodic sales.

Still a further object of the invention is to provide a method for segregating and collecting tickets in order to check upon the sales and the honesty of employees selling and handling and receiving such admission tickets.

It is well known in the motion picture theatre field that various types of fraud and losses occur in connection with the collection of theatre tickets. In many instances the ticket taker has been found to be in league with the cashier or local theatre manager so that instead of the theatre ticket taker tearing the ticket in half and retaining the stub, he palms the entire ticket and after collecting a number of them will return them to the cashier for resale and the proceeds are later divided between the cashier and the ticket taker or other employees. This invention therefore, provides for the deposit of one-half of the ticket upon a rod so that the stub will no longer be accessible to the ticket taker. As the tickets are sold, since such tickets are consecutively numbered, they are received by the ticket taker and placed upon a specific rod, and such tickets will be filed on the rod and will be more or less consecutively numbered. Periodically, such as every hour, a metal disc is provided which acts as a separator so that the number of tickets sold hourly can be determined by checking the number of tickets upon the rod within the device. It is also known practice to have the ticket seller list the number of tickets sold each hour upon the hour. This device will therefore provide a ready check between the tickets sold and the tickets taken by the ticket taker. In checking the numbers of the tickets upon the rod within the device, it can readily be noticed if the tickets run more or less in a consecutive sequence. If it is found that the continuity of the stubs upon the rod vary, it can easily be discovered that such tickets may have been resold by the cashier. Or, if stubs are missing after a recheck, it will reveal fraud.

By providing different rods and a colored means for identifying the different rods, the different priced tickets can be readily segregated. Also the different rods can be used for segregating tickets sold during the morning period, the afternoon period, and the evening period.

A further object is to provide a device wherein the stubs of admission tickets can be locked against manipulation by the ticket taker or by anyone else connected with the theatre except the person who will have the complete responsibility and charge of the checking of such admission tickets sold and collected within the device.

Still a further object is to provide a means, as in this instance a wire, whereby the stubs of admission tickets and the markers can be easily removed and retained in the same sequence and continuity as when received by the ticket taker in order to provide a means for checking at a later time and date against the sales made. Such means can also be used for retaining such admission ticket stubs for the purpose of checking. With this device the stubs so collected can remain locked within the device for a full week, thereby it eliminates the daily removal of such stubs from the ticket box.

For a fuller understanding of the nature and objects of the invention, reference is had to the following detailed description in connection with the accompanying drawings in which:

Figure 1 is a vertical sectional view taken along line 1—1 of Figure 3.

Figure 2 is a sectional view taken along line 2—2 of Figure 3, the bottom portion being broken away.

Figure 3 is a top view showing a portion of the cover broken away.

Figure 4 is a sectional view similar to that shown in Figure 1 showing the bottom portion which retains the hollow rods or tubes partly removed from the housing or container.

Figure 5 is a perspective view of the housing or container and showing some of the removable extensions or leaders in position upon the hollow rods or tubes.

Figure 6 is an enlarged view partly in section of the holder for the rods or tubes and the means for retaining the tubes in vertical position.

Figure 7 is a sectional view taken along line 7—7 of Figure 6.

Figure 8 is a sectional view taken along line 8—8 of Figure 1.

Figure 9 shows one of the tubes removed from the device and showing the tickets and markers being removed upon a wire from the tube.

Figure 10 shows a series of tickets and markers retained upon the wire in locked position for checking and inspection.

Figure 11 shows one of the admission tickets, the dot and dash line representing the approximate tearing line to show the stub.

Figure 12 represents approximately one-half of the ticket representing the stub.

Figure 13 is a perspective view of one form of indicator, marker or separator for the tickets indicating an interval of time thereon.

Referring to the drawings, numeral 10 represents a container substantially square in cross section having a rear wall 11, sides 12 and 13 and front 14, a bottom 15 and a hingeable top 16. The bottom of the container holds a removable base 17 which has a series of aligned holes 18 for receiving hollow rods 19, retaining such hollow rods in vertical position. The front portion of the base 17 has a channel 20 which permits the fingers to grip the base in order to remove the base from the container as shown in Figure 4. Within the hollow rods 19 wires 21 are positioned for the purpose as will be hereinafter explained. It should be noted that the wires come through the bottom of the rods and are held within the opening 18, thus retaining the wire so that it is in condition to be removed from the rod when desired. Rods 19 run a short distance below the top 16. Top 16 has a series of square holes 22 directly over each of the rods 19. An extension member 23 of the same diameter as that of the rods 19 and having a pin 24 seated within the hollow of the rod so that the extension member 23 will extend through the holes or openings 22. Extensions 23 are preferably made of plastic and may be varied in color for the purpose as will be hereinafter described. Extensions 23 act as guides to receive the stubs 25, the hole 26 of such stubs being slightly larger than the diameter of the extension 23 and the rods 19 to permit the stub to slide down the extension and the rod without much resistance.

A series of slides 27 fit within a groove 28 at one of the sides 13 of the container and close a line of openings 22 when the rods 19 beneath such openings are not in use.

The top 16 has at the front thereof a lock 29 so that the rods 19 and the stubs 25 can be locked within the container 10.

In order to operate the method of collecting stubs to prevent cheating, the container 10, containing the rods 19 therein as shown in the drawings, is locked with lock 29 against the removable front 14. Assuming that the first three rows of rods are to be used (see Figure 5) the last three rows of openings 22 are closed by inserting slides 27. Extension members 23 each of a different color are placed in position through openings 22 by inserting pins 24 into the top of the hollow rods 19 with the colored ends extending over the top 16. The colored extension members 23 can designate the morning, afternoon and evening shows, children's admissions, and the differently priced tickets for adults representing seats in various different parts of the theatre. Assuming further that the device is being used during the afternoon session or show, for example from 1 P. M. to 5 P. M. The red extension 23 can be used for children's tickets, blue for adults' orchestra tickets, yellow for balcony tickets and green for lounge tickets. As the purchasers of the tickets enter the theatre, the ticket taker at the door tears the ticket 30 (Figure 11) in half, each half containing a duplicate serial number and a hole 26. One half is given to the patron and the other half is deposited upon the proper colored extension 23 representing the differently priced ticket purchased, thus segregating the stubs 25 upon the rods 19 and keeping them in the approximate order sold, that is approximately in consecutive numbers. It is the practice generally for the cashier to keep a chart noting the ticket number sold on the hour of each denomination. With this method it will be the duty of the ticket taker to drop a time disk 31 having a central opening 32 preferably made of metal (see Figure 13) upon each extension 23 at the end of each hour. This will act as a check upon the cashier. The dropping of disks 31 upon rods 19 will also cause the stubs 25 to drop towards the base of the rods. Since the ticket taker cannot obtain the stubs once inserted upon the rods 19 and since the ticket numbers can be readily checked for sequence and continuity, it is a simple matter to determine whether or not the ticket taker and cashier are honest. The number of tickets sold hourly of the different denominations can also be easily checked against the cashier's chart.

In order to remove the stubs 25 from the container 10, the manager or the person in charge (possibly from the main office) opens lock 29, opens the top 16 and removes the front 14. He then slides out the removable base 17 (Figure 4) and lifts each rod 19 out of its hole 18. By holding the bottom end of wire 21 he permits the stubs 25 and disks 31 to drop from rod 19 onto the wire 21 (see Figure 9). The two ends of wire 21 are then twisted together as shown in Figure 10 and a tag is attached upon which desired information is written, such as the date, number of tickets sold each designated hour, the name of the person removing the stubs, etc. The twisted ends of the wire may also be sealed with a numbered lead seal or other known method. The unit shown in Figure 10 is then sent to the office or warehouse of the theatre owner and checked at leisure and stored for future reference.

The rods 19 are then replaced into holes 18 inserting a new wire 21 before it is inserted. By allowing the end of the fine wire 21 to extend beyond the bottom end of the rod 19 and bending it up as shown in Figures 1, 4, 6, and 7, the rod 19 is rigidly wedged within hole 18 and the wire end is easily available for removing the stubs and disks.

The different rods 19 and holes 18 may be used for different days. It is obvious that the container and top may be made sufficiently large to accommodate more rods than shown and many more rows of openings 18 may be placed in the top 16 so that the stubs can be removed less frequently. Disks similar to Figure 13 may be used with a date thereon so that an entire weeks accumulation of ticket stubs may be removed at one time thus saving daily removal and checking of stubs. Further changes and modifications may be made in the details of construction and arrangement of parts without departing from the general spirit of the invention.

We claim:

1. A cabinet for collecting admission ticket stubs having holes therein comprising an upright case, stationary walls around said case, a bottom, a hingeable top and a door for said cabinet, a lock attached to said top for locking said top and a lock attached to said door for locking said door to prevent stubs from being removed from said cabinet, a removable base adapted to fit within the bottom of said cabinet, openings in said base, removable hollow rods fitted into said openings in said base for retaining said rods in vertical position, said rods extending within a short distance beneath said top, aligned openings in said top over each of said rods, removable extension members seated upon said rods, said extension members extending through said openings in said top to permit said ticket stubs to be placed upon said extension members permitting said stubs to slide down upon said rods into said cabinet.

2. A cabinet for collecting admission ticket stubs comprising an upright case, stationary walls around said case, a bottom, a hingeable top and a door for said cabinet, a lock attached to said top for locking said top and a lock attached to said door for locking said door to prevent stubs from being removed from said cabinet, a removable base adapted to fit within the bottom of said cabinet, openings in said base removable hollow rods fitted loosely into said openings in said base for retaining said rods in vertical position, a removable wire within each of said hollow rods for removing and retaining said stubs placed upon said rods, said wires bent upward from the bottom of said rods, wedging said rods into said openings, said hollow rods extending within a short distance beneath said top, aligned openings in said top over each of said rods, extension members of same diameter as said rods removably seated upon the tops of said rods, said extension members extending through said openings in said top to permit said ticket stubs to be placed upon said extension members permitting said stubs to slide downward upon said rods into said cabinet, whereby admission ticket stubs may be filed upon said rods and removed therefrom upon said wire in the same sequence as filed upon said rods.

3. A cabinet for collecting ticket stubs having holes therein comprising an upright case having walls, a bottom, a hingeable top, and a door for said cabinet, a lock attached to said top for locking said top and a lock attached to said door for locking said door, a removable base within said cabinet, openings in said base, removable hollow rods fitted into said openings in said base to retain said rods in vertical position, a removable wire within each of said hollow rods, said rods extending to within a short distance from said top, aligned openings in said top over each of said rods, extension members of the same diameter of said rods removably seated upon said rods, said extension members extending through said openings in said top, one end of said wires adapted to be bent along the bottom end of said rods to wedge and aid in maintaining said rods in vertical position within the openings of said base, a horizontal opening between said top and one of said sides slides within said horizontal opening for closing said aligned openings of said top whereby said ticket stubs may be consecutively filed upon said rods sliding downward thereon falling within said cabinet.

IRVING DASHKIN.
HENRY RANDEL.

REFERENCES CITED

The following references are of record in the file of this patent:

UNITED STATES PATENTS

| Number | Name | Date |
|---|---|---|
| 113,131 | Baker | Mar. 5, 1892 |
| 472,235 | Southwick | Apr. 5, 1892 |
| 602,032 | Mauer | Apr. 5, 1898 |
| 945,434 | Allen | Jan. 4, 1910 |
| 998,541 | McBee | July 18, 1911 |
| 1,382,802 | Rendle | June 28, 1921 |
| 1,705,842 | Vogel | Mar. 19, 1929 |
| 2,238,724 | Freedman | Apr. 15, 1941 |

FOREIGN PATENTS

| Number | Country | Date |
|---|---|---|
| 350,399 | France | Nov. 23, 1905 |
| 589,696 | France | Feb. 6, 1925 |